United States Patent
Zhou et al.

(10) Patent No.: US 11,451,798 B2
(45) Date of Patent: Sep. 20, 2022

(54) METHOD OF ENCODING VIDEO WITH FILM GRAIN

(71) Applicant: ARRIS Enterprises LLC, Suwanee, GA (US)

(72) Inventors: Wei Zhou, Milpitas, CA (US); Jane Perera, Saratoga, CA (US); Wayne D. Michelsen, Santa Clara, CA (US); Swaroop Chanda, Santa Clara, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 609 days.

(21) Appl. No.: 14/962,814

(22) Filed: Dec. 8, 2015

(65) Prior Publication Data

US 2016/0198165 A1 Jul. 7, 2016

Related U.S. Application Data

(60) Provisional application No. 62/099,672, filed on Jan. 5, 2015.

(51) Int. Cl.
*H04N 19/184* (2014.01)
*H04N 19/115* (2014.01)
(Continued)

(52) U.S. Cl.
CPC ......... *H04N 19/184* (2014.11); *H04N 19/115* (2014.11); *H04N 19/117* (2014.11);
(Continued)

(58) Field of Classification Search
CPC .... H04N 19/184; H04N 19/117; H04N 19/85; H04N 19/70; H04N 19/136;
(Continued)

(56) References Cited

U.S. PATENT DOCUMENTS 8,243,804 B2 8/2012 Soroushian et al.
9,813,706 B1 * 11/2017 Lin ..................... H04N 19/134
(Continued)

FOREIGN PATENT DOCUMENTS

EP 2048888 A1 4/2009
WO 03/077549 A1 9/2003

OTHER PUBLICATIONS

Adaptive Rood Pattern Search for Fast Block-Matching Motion Estimation, Yao Nie, Student Member, IEEE, and Kai-Kuang Ma, Senior Member, IEEE,IEEE Transactions on Image Processing, vol. 11, No. 12, Dec. 2002.*

(Continued)

*Primary Examiner* — Nasim N Nirjhar
(74) *Attorney, Agent, or Firm* — Chernoff, Vilhauer, McClung & Stenzel, LLP

(57) ABSTRACT

A system for providing improved video quality and compression efficiency during encoding by detecting video segments having film grain approaching the "Red Lady" problem. The system detects when film grain approaches the level of the "Red Lady" problem by measuring frame-by-frame temporal differences (ME scores). From the ME scores, two key indicators are identified: (1) The average temporal difference in frames with an intermediate motion level higher than frames of non-noisy video; and (2) The fluctuation of the temporal differences between frames in a group is very small. When these indicators identify a high film video, a signal is provided to an encoder which allocates less bits to I frames and more bits to P and B frames than for other frames of video without comparable film grain.

6 Claims, 4 Drawing Sheets

(51) Int. Cl.

| | |
|---|---|
| *H04N 19/86* | (2014.01) |
| *H04N 19/124* | (2014.01) |
| *H04N 19/51* | (2014.01) |
| *H04N 19/137* | (2014.01) |
| *H04N 19/179* | (2014.01) |
| *H04N 19/593* | (2014.01) |
| *H04N 19/117* | (2014.01) |
| *H04N 19/119* | (2014.01) |
| *H04N 19/136* | (2014.01) |
| *H04N 19/70* | (2014.01) |
| *H04N 19/85* | (2014.01) |

(52) U.S. Cl.
CPC ......... *H04N 19/119* (2014.11); *H04N 19/124* (2014.11); *H04N 19/136* (2014.11); *H04N 19/137* (2014.11); *H04N 19/179* (2014.11); *H04N 19/51* (2014.11); *H04N 19/593* (2014.11); *H04N 19/70* (2014.11); *H04N 19/85* (2014.11); *H04N 19/86* (2014.11)

(58) Field of Classification Search
CPC .... H04N 19/119; H04N 19/179; H04N 19/86; H04N 19/137; H04N 19/124; H04N 19/593; H04N 19/115; H04N 19/51
See application file for complete search history.

(56) References Cited

U.S. PATENT DOCUMENTS

| | | | |
|---|---|---|---|
| 2003/0053543 A1* | 3/2003 | Bhaumik | H04N 5/145 375/240.16 |
| 2004/0130680 A1* | 7/2004 | Zhou | H04N 19/85 352/38 |
| 2006/0140267 A1* | 6/2006 | He | H04N 19/159 375/240.03 |
| 2006/0197855 A1 | 9/2006 | Shen | |
| 2008/0152296 A1 | 6/2008 | Oh et al. | |

OTHER PUBLICATIONS

Examination Report, RE: Great Britain Application No. GB1522138.5, dated Feb. 22, 2017.

PCT Search Report & Written Opinion, Re: Application No. PCT/US2015/064703, dated Mar. 7, 2016.

P. Schallauer, et al. "Rapid and Reliable Detection of Film Grain Noise", IEEE International Conference on Image Processing, Jan. 1, 2006, pp. 413-416.

Combined Search Report and Examination, RE: Great Britain Application No. GB1522138.5, dated Jan. 28, 2016.

European Examination Report, Re: Application No. 15200232.5, dated Jul. 13, 2018.

* cited by examiner

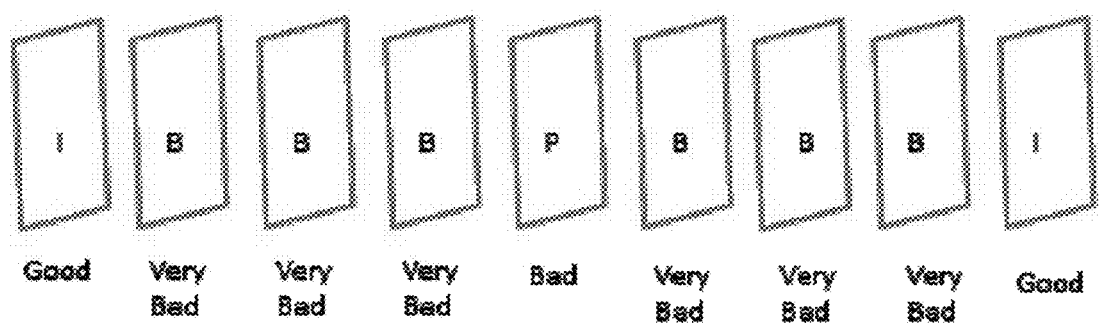
FIG. 3
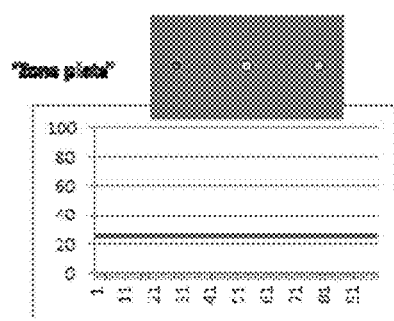 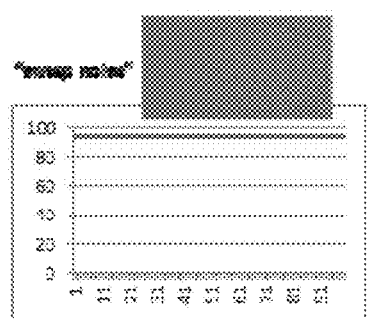 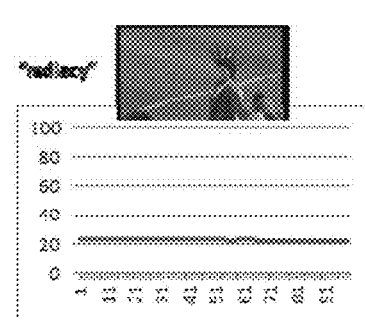
FIG. 4A    FIG. 4B    FIG. 4C

FIG. 4D  FIG. 4E  FIG. 4F

METHOD OF ENCODING VIDEO WITH FILM GRAIN

CROSS REFERENCE TO RELATED APPLICATION

This Application claims priority under 35 U.S.C. § 119(e) from earlier filed U.S. Provisional Application Ser. No. 62/099,672 filed on Jan. 5, 2015 and incorporated herein by reference in its entirety.

BACKGROUND

Technical Field

The present invention relates to a process for improving video quality when encoding video with film grain. More particularly, the present invention relates to a solution to improving video quality when film grain is present on a level similar to the "Red Lady" noise problem.

Related Art

Film grain is hard to compress in an encoder. It requires more bits to encode than many other kinds of content for any level of video quality. Film grain may be thought of as a particular kind of spatial temporal noise. As such, film grain has low temporal predictability from one frame to any other frame of video. Thus, the encoding process is limited in its ability to leverage inter-frame estimation to achieve significant compression efficiency.

In some encoders, not enough bits are allocated to inter-predicted pictures. The result can be significant video quality artifacts such as I-frame beating and intermittent repetitive loss and recovery of spatial texture. Even encoders that can allocate significant bits might not be able to eliminate substantial noise, such as when noise is as high as in the "Red Lady" video frames.

A. The "Red Lady" Problem

A frame of the "Red Lady" video is illustrated with FIG. 1. The "red lady" video shows that a lady walking alongside a soccer field with a grassy background. The scene itself is simple, but the entire video is filled with film grain.

Film grain is like random noise. It requires a lot of bits to encode and is not temporally predictable, which makes high film grain video, in particular the "Red Lady" video, very difficult to encode.

A common practice to encode video with film grain is to encode a good quality I frame as a reference frame as a prediction frame for subsequent predictive frames (P or B frames). However, since the I frame and P and B frames all contain film grain this does not predict well, and many bits are needed to encode unpredicted high frequency components. If too many bits are allocated to the I frame, later P and B frames may be allocated fewer bits than they need, and their quality suffers. The good quality I frame, thus, may not help with the subsequent P and B frames.

In the Red Lady Video, the random noise level is very high. Thus, in the Red Lady Video, a beating effect will be seen, due to the quality of the pictures varying too much between frame types. Allocating more bits to the I frame does not help with reducing film grain in subsequent P and B frames in a typical encoder.

B. The "Dirty Window" Problem

As shown in FIG. 2, the difference between two consecutive frames is mostly noise. Encoding a good quality I frame for these costs too many bits and leaves fewer bits for predictive frames. Moreover, the high quality I frame, even with additional bits allocated, is not a good reference frame because the noisy temporal differences cannot be motion predicted well. With the I frame as a reference, the film grains in the predictive frames would be poorly encoded, and create a quality disparity between I and predictive frames, as illustrated in FIG. 3. Thus allocating more bits to the I frame creates a "Dirty Window" for future film grain elimination in P and B frames.

Accordingly, it is desirable to provide better solutions for eliminating film grain comparable to the "Red Lady" video, and to avoid creating "Dirty Window" I frames.

SUMMARY

Embodiments of the present invention provide a system that enables improved video quality and compression efficiency during encoding by detecting video segments having film grain approaching the "Red Lady" problem and then optimizing the bit allocation between intra- and inter-predicted pictures using bit allocation variation between I, P and B type frames.

To optimize the bit allocation when a video clip is identified as a "Red Lady" like clip, embodiments of the present invention encode smaller I frames and allocate more bits on P and B frames. Since allocating more bits to the I frame when the "Red Lady" film grain problem occurs does not enable better prediction for encoding in the P and B frames, additional bits to the I frame are not necessary. Thus, allocating extra bits allocated to the P and B frames and not using the extra bits in the I frame enables reduction of frame grain when the "Red Lady" like film grain problem occurs, and the "Dirty Window" I frame issue will no longer be a consideration.

To identify the film grain level to determine when the optimization of bit allocation away from I frames to P and B frames should occur, a temporal analysis of motion-prediction data available is provided. For the temporal analysis, measurements of plotted frame-by-frame temporal differences (ME scores) of the received videos are determined. From the ME scores, two key indicators are identified: (1) The average temporal difference in frames with an intermediate motion level (i.e., greater than ME score of 20), is higher than frames of non-noisy video with intermediate motion; and (2) The fluctuation of the temporal differences between frames in a group is very small, unlike the non-noise video with natural motions which have higher motion differences without the noise. These two indicators are set to identify when a special bit allocation ratio between the I, P and B frames should be applied so that there will tend to be less difference between frame types for film-grain content.

The system according to embodiments of the present invention uses a preprocessing filter that analyzes video frames prior to the encoder. The preprocessing filter computes the temporal difference score and stores it in a queue of data provided with the frames to the encoder. The encoder analyzes the temporal difference scores. If it is detected that the average of all temporal differences is higher than a threshold and the variance of them are smaller than a threshold, it means the video contains significant film grain or noise. Based on the level of film grain or noise detected, the encoder allocates bits to I, P and B frames dynamically.

BRIEF DESCRIPTION OF THE DRAWINGS

Further details of the present invention are explained with the help of the attached drawings in which:

FIG. 3 illustrates that with an I frame as a reference, the film grains in the predictive frames would be poorly encoded, and create a quality disparity between I and predictive frames;

FIGS. 4A-4F show the measured and plotted frame-by-frame temporal differences (ME scores) of various video clips;

DETAILED DESCRIPTION

For embodiments of the present invention, if a clip can be identified as a "Red Lady" like clip, good quality can be achieved by encoding smaller I frames and allocating more bits on P and B frames.

To help understand how a determination of when a clip is a "Red Lady" type clip, several different clips of data are analyzed. FIGS. 4A-4F show the measured and plotted frame-by-frame temporal differences (ME scores) of various video clips. In FIGS. 4A-4F, the X axis is a frame index and the Y axis shows a scaled ME score ranging from 0 to 100.

From the measurements in FIGS. 4A-4F, two key indicators of noisy video are found: (1) The average temporal difference is at an intermediate level (greater than ME score of 20), and the ME score is higher than the one of non-noisy video with intermediate motion; and (2) The fluctuation of the temporal differences is very small, not like the non-noise video with natural motions. These two indicators are, thus, used to identify "Red Lady" like video frames from any streaming video.

FIGS. 4A-4C illustrate the ME score levels for video with noise and limited or no motion. In FIG. 4C, the Red Lady video has a constant noise level ME score of just over 20. The "Sweep" video noise levels of FIG. 4B are very high with an ME noise level of near 100. The "Zone Plate" noise with no motion and a set noise level has an ME score of just over 20 and can be used as a reference for ME levels. Note that in the "Blacksmith" frame of FIG. 4D, a normal video that does not need special treatment during encoding using embodiments of the present invention that the temporal average noise difference is far below an ME level of 20 found with the "Red Lady" video of FIG. 4C.

Unlike the "Blacksmith" of FIG. 4D, the "Sprinkler Lady" of FIG. 4E meets both the two key factors of (1) an ME score over 20 and (2) the fluctuation of the temporal differences is small even taking into account motion. The final video of "Basketball" in FIG. 4F has a relatively high ME score, but it is less than 20, and the motion in the video accounts for ME levels that on average may push the total ME score over 20. However with the criteria of (1) an average temporal difference with a ME score greater than 20 and (2) the fluctuation of the temporal differences very small, the video of FIG. 4F does not require embodiments of the present invention to be used during encoding.

Figure 1:
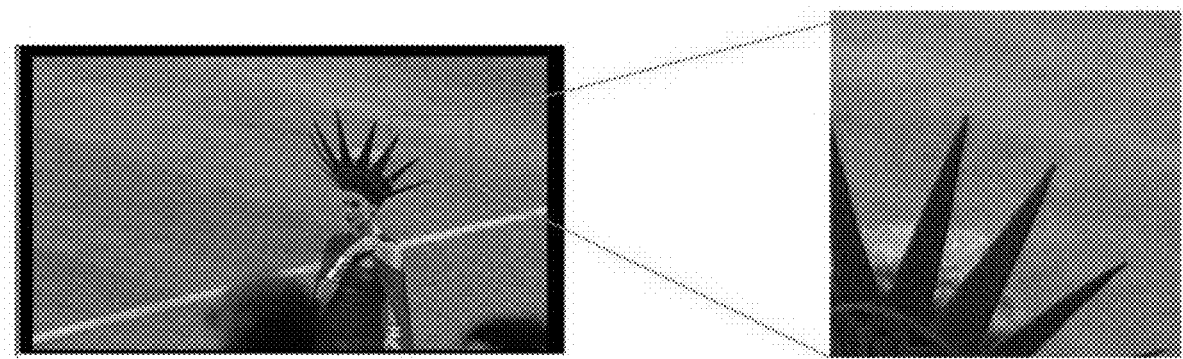
FIG. 1 shows a frame from the "Red Lady" video.
Figure 2:
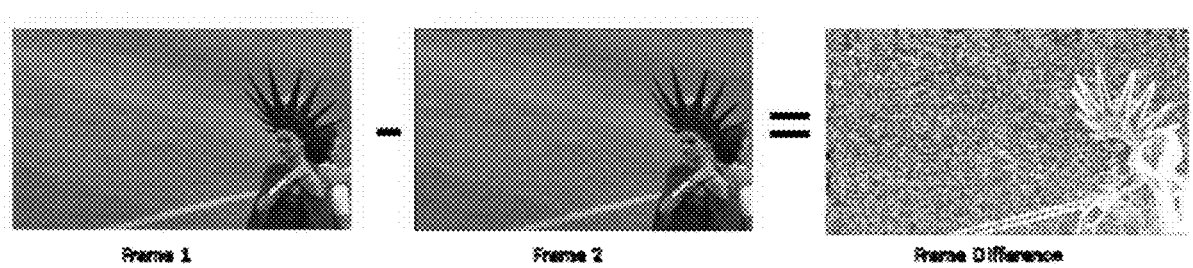
FIG. 2 illustrates that for the "Red Lady" video frames, the difference between two consecutive frames is mostly noise.
Figure 5:
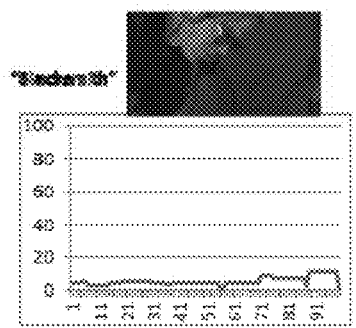
FIG. 5 is a diagram of components for implementing embodiments of the present invention in an encoding system.
Figure 5:
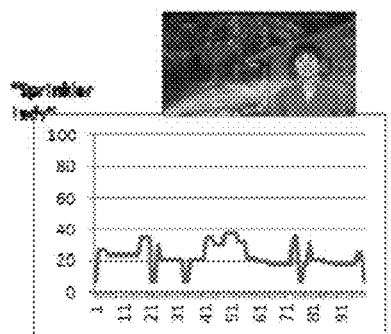
Figure 5:
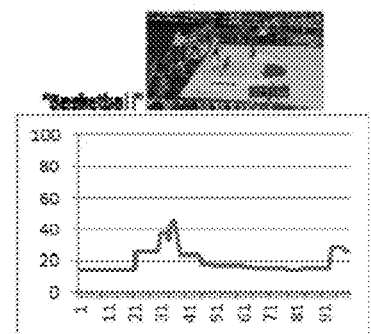
Figure 5:
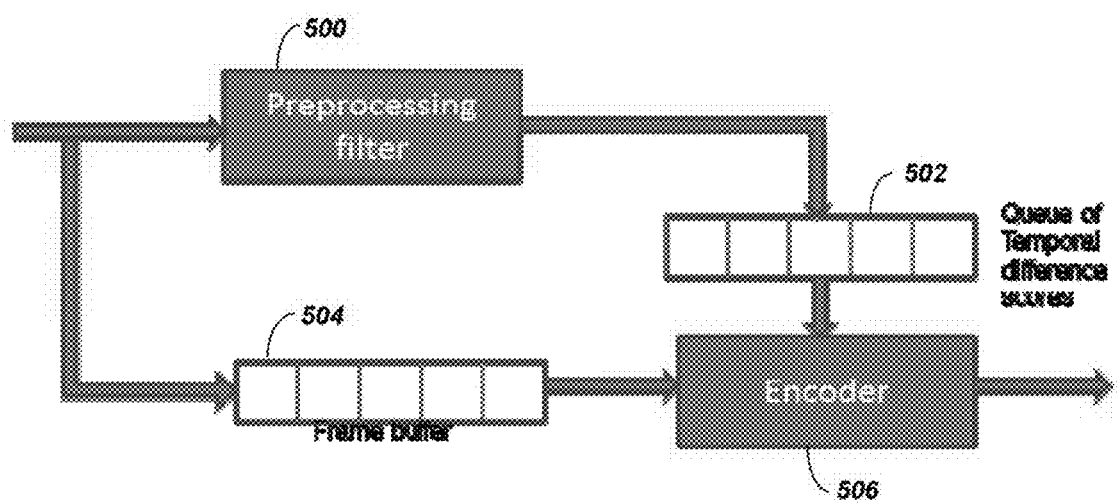

FIG. 5 is a diagram of one embodiment of components for implementing embodiments of the present invention in an encoding system. In FIG. 5, the preprocessing filter 500 computes the temporal difference score and stores it in the queue 502. The encoding in encoder 506 will be delayed by the frame buffer 504 until temporal difference scores of N frames are collected in the queue 502. The encoder 506 analyzes the temporal difference scores of N frames. If it is detected that the average of all temporal differences is higher than a threshold and the variance of them are smaller than a threshold, it means the video contains significant film grain or noise. Based on the level of film grain or noise detected, the encoder 506 allocates bits to I, P and B dynamically according to embodiments of the present invention described herein. Generally, if the level of film grain or noise is high, the encoder allocates more bits to P and B frames than for other content.

Figure 6:
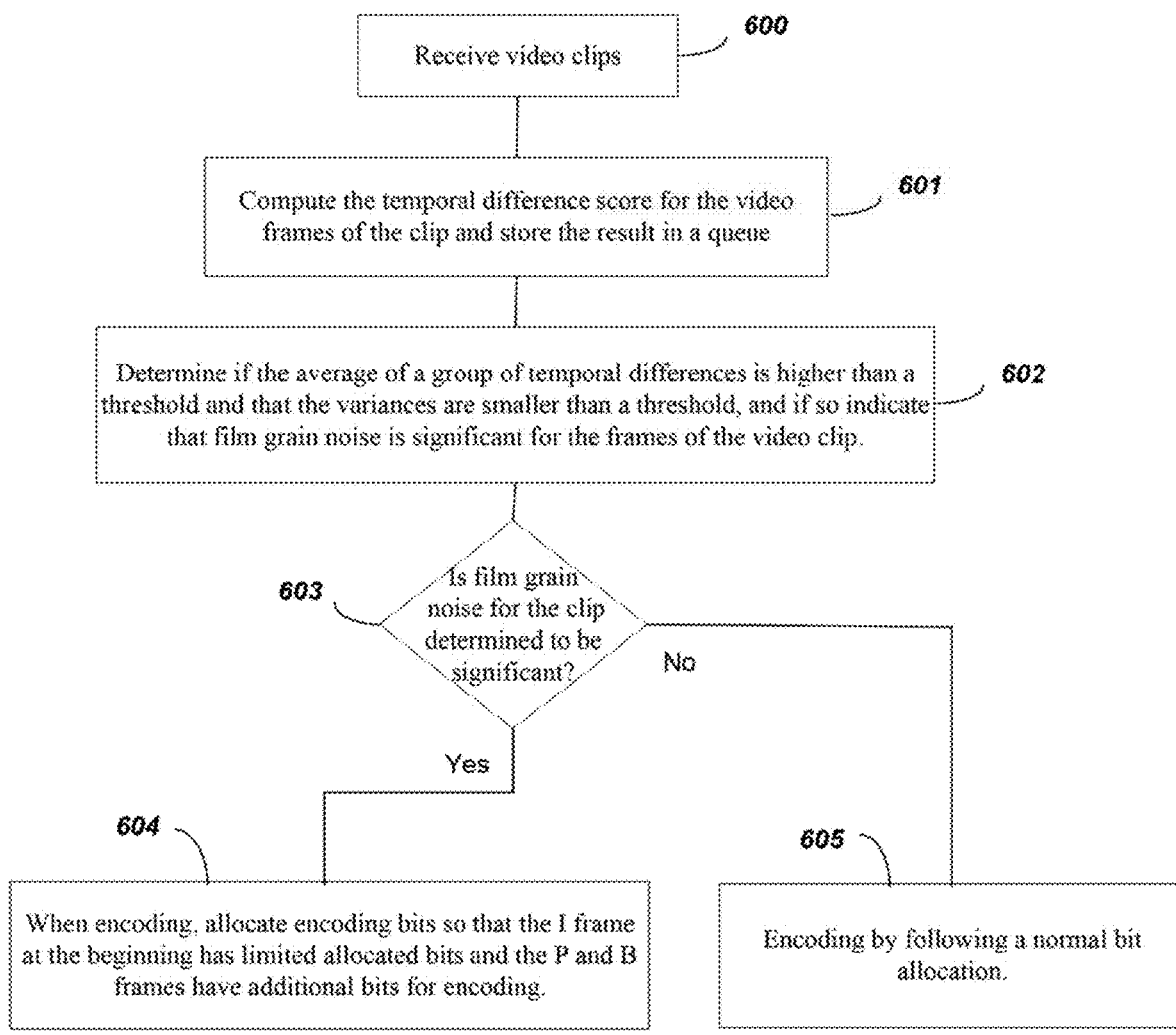
FIG. 6 is a flow chart illustrating steps for implementing encoding with film grain according to embodiments of the present invention.

FIG. 6 is a flow chart illustrating steps for implementing encoding when high film grain is detected according to embodiments of the present invention. First, in step 600 the video clips are received, such as the "Red Lady" clip illustrated in FIG. 4C. Next, in step 601, the temporal difference score, or ME score, is determined for the video frames and the result for each frame stored in a queue to provide to the encoder. Next, in step 602 a determination is made to decide if film grain noise is high enough to constitute "Red Lady" type film grain that requires application of embodiments of the present invention. For the step 602 determination, if the average of a group of temporal differences is higher than a threshold and the variance is smaller than a threshold, the film grain noise is indicated to be significant for the frames of the video clip.

Once the determination is made in 602, next in step 603 the determination is reviewed. If film grain noise for the clip is determined to be significant, then the program proceeds to step 604. If the film grain noise is determined to be insignificant, the program proceeds to step 605. In step 604 when high film grain noise is detected encoding is performed by allocating enough bits so that the I frame at the beginning has little additional bits and the P and B frames have additional bits for encoding. In step 605 when film grain noise is not detected as high, a normal bit allocation is performed by the encoder.

The results of applying the algorithm shown in FIG. 6 will reduce the "dirty window" effect. The algorithm also makes some high texture clips, such as "sprinkler" of FIG. 4E, look sharper. The algorithm does not change the quality of other non-noisy clips that do not rise to the detected level of the "Red Lady" video.

For reference, Appendix A below shows an example of coding in "C" to implement the algorithm illustrated by FIG. 6.

For components shown, like the pre-processing filter 500 and the encoder 506, each component according to embodiments of the present invention can include a processor and memory to enable operation. The memory of each device stores code that is executable by the processor to enable the processor to perform the processes described herein. Further the memory can be used to provide data storage with the data accessible by the processor to store or retrieve when performing operations.

Although the present invention has been described above with particularity, this was merely to teach one of ordinary skill in the art how to make and use the invention. Many additional modifications will fall within the scope of the invention as that scope is defined by the following claims.

APPENDIX A

```c
//
// code for Red Lady film grain detection
#define RC_DYNAMIC_QMUL_ME_SCORE_MEAN_THRESHOLD_MIN 20
#define RC_DYNAMIC_QMUL_ME_SCORE_MEAN_THRESHOLD_MAX 75
#define RC_DYNAMIC_QMUL_ME_SCORE_VARIANCE_THRESHOLD 2
uint8_t get_qmul_b_increase_from_lookahead ( hlenc_fbnode_t* fbnode, uint8_t first_pass_enc_id)
{
   img_par_t *imgpar = get_imgpar_by_fbnode(fbnode);
   uint32_t vfid = GET_DB_INDEX( fbnode->ext_vcap_pi );
   uint32_t offset_tf = 0, offset_bf = 0;
   scene_change_info_t scene_change_info;
   uint8_t scene_id_first = 0;
   int8_t me_score[RC_2PASS_LOOKAHEAD_DISTANCE_DYNAMIC_QMUL] = {0};
   uint32_t me_score_cnt = 0;
   uint32_t i = 0, sum = 0, var = 0;
   int8_t mean = 0;
   uint8_t b_increase = RC_DEFAULT_B_INCREASE_FOR_QMUL;
   //get offset of the me_score for top and bottom field
   offset_tf = (uint32_t)(&(((ext_vcap_package_t *)0)->sc_info_frm_top));
   offset_bf = (uint32_t)(&(((ext_vcap_package_t *)0)->sc_info_bot));
   //get the first scene_info
   get_epi_data(MAKE_DB_ID(first_pass_enc_id, (vfid & 0xFF)), (uint32_t)&scene_change_info, offset_tf, sizeof(scene_change_info_t));
   scene_id_first = scene_change_info.scene_id;
   //the me_score for the first frame is always big because it is calculated between the new scene and old scene
   // we only want to use the me_score of the new scene
   do
   {
      vfid++;
      get_epi_data(MAKE_DB_ID(first_pass_enc_id, (vfid & 0xFF)), (uint32_t)&scene_change_info, offset_tf, sizeof(scene_change_info_t));
      //todo: check scene change instead of scene id?
      if ( scene_id_first != scene_change_info.scene_id )
      //if ( scene_change_info.sc_here )
      {
         orc_printf("scene_id_first %d scene_change_info.scene_id %d me_score_cnt %d",scene_id_first,scene_change_info.scene_id,me_score_cnt);
         break;
      }
      me_score[me_score_cnt++] = ( scene_change_info.me_score>>3 );
      if ( imgpar->pic_is_field )
      {
         //get me score for bottom field
         get_epi_data(MAKE_DB_ID(first_pass_enc_id, (vfid & 0xFF)), (uint32_t)&scene_change_info, offset_bf, sizeof(scene_change_info_t));
         me_score[me_score_cnt++] = ( scene_change_info.me_score >>3 );
      }
   } while ( me_score_cnt < RC_2PASS_LOOKAHEAD_DISTANCE_DYNAMIC_QMUL );
   //get the mean and variance
   for ( i = 0; i < me_score_cnt; i ++)
   {
      sum += me_score[i];
      //orc_printf("me_score[%d] %d",i,me_score[i]);
   }
   mean = sum/me_score_cnt;
   for ( i = 0; i < me_score_cnt; i ++)
   {
      var += (me_score[i] - mean)*(me_score[i] - mean);
   }
   var /= me_score_cnt;
   //this is to check redlady like noisey video.
   // When the average me_score is higher than a threshold but me_scores have a very small fluctuation, it means the temporal prediction error
   // was primarily casued by a low level of noise not the actual natural motion. In this case, we want to spend more bits on P and B frames so we encode less skip blocks.
   if (mean > RC_DYNAMIC_QMUL_ME_SCORE_MEAN_THRESHOLD_MIN && mean < RC_DYNAMIC_QMUL_ME_SCORE_MEAN_THRESHOLD_MAX &&
       var <= RC_DYNAMIC_QMUL_ME_SCORE_VARIANCE_THRESHOLD)
   {
      b_increase = 25;
   }
   //orc_printf(" me_score_mean %d var %d b_increase %d",mean, var, b_increase);
   return b_increase;
}
```

What is claimed:

1. A method for encoding video comprising:
   obtaining video frames provided to an encoder configured to compresses the video frames;
   obtaining motion estimation (ME) data for the video frames;
   calculating a ME score for the video frames, wherein the ME score provides a measurement of plotted frame-by-frame temporal differences;
   calculating an ME stability value measuring a variance of the ME score over time; and
   providing a high film grain indication signal to the encoder indicating a particular segment of the video frames contains high film grain when the ME score for the segment exceeds a first threshold and the ME stability value for the segment is below a second threshold,
   wherein when the high film grain indication signal is provided, the encoder compresses the video frames by allocating less bits to I frames and more bits to P and B type frames than to other frames of the video.

2. The method of claim 1, wherein when the high film grain indication is not provided, the encoder allocates more bits to the I frame than when the high film grain indication is provided.

3. The method of claim 1, wherein the first threshold is greater than 20.

4. An apparatus to encode video frames, the apparatus comprising:
   an encoder configured to compresses the video frames and having a first input for receiving video frames to be processed and a second input for receiving parameter data to enable the encoder to allocate bits for frames for encoding;
   a frame buffer having an input receiving the video frames and an output providing the first input to the encoder;
   a preprocessor for receiving the video frames and having an output providing the second input to the controller;
   a preprocessor memory connected to the processor for storing code that is executable by the preprocessor to determine the parameter data to enable the encoder to allocate bits, the code causing the preprocessor to perform the following steps;
   obtaining motion estimation (ME) data for the video frames;
   calculating a ME score for the video frames, wherein the ME score provides a measurement of plotted frame-by-frame temporal differences;
   calculating an ME stability value measuring a variance of the ME score over time; and
   providing a high film grain indication signal to the encoder indicating a particular segment contains high film grain when the ME score exceeds a first threshold and the ME stability value is below a second threshold,
   wherein when the high film grain signal is provided, the encoder compresses the video frames by allocating less bits to I frames and more bits to P and B type frames than to other frames of the video.

5. The apparatus of claim 4, wherein when the high film grain indication is not provided, the encoder allocates more bits to the I frame than when the high film grain indication is provided.

6. The apparatus of claim 4, wherein the first threshold is greater than 20.

* * * * *

UNITED STATES PATENT AND TRADEMARK OFFICE
CERTIFICATE OF CORRECTION

PATENT NO. : 11,451,798 B2
APPLICATION NO. : 14/962814
DATED : September 20, 2022
INVENTOR(S) : Wei Zhou et al.

It is certified that error appears in the above-identified patent and that said Letters Patent is hereby corrected as shown below:

In the Specification

Column 7, Line 4: Replace "compresses" with --compress--

Column 7, Line 30: Replace "compresses" with --compress--

Signed and Sealed this
Fourth Day of June, 2024

Katherine Kelly Vidal
*Director of the United States Patent and Trademark Office*